(12) United States Patent
Haussmann et al.

(10) Patent No.: US 6,868,924 B2
(45) Date of Patent: Mar. 22, 2005

(54) ROCK DRILL

(75) Inventors: August Haussmann, Ravensburg (DE); Gerhard Schwarz, Blitzenreute (DE)

(73) Assignee: Hawera Probst GmbH, Ravensburg (DE)

( * ) Notice: Subject to any disclaimer, the term of this patent is extended or adjusted under 35 U.S.C. 154(b) by 24 days.

(21) Appl. No.: 10/275,433

(22) PCT Filed: Mar. 22, 2001

(86) PCT No.: PCT/DE01/01111
§ 371 (c)(1),
(2), (4) Date: Nov. 6, 2002

(87) PCT Pub. No.: WO01/88321
PCT Pub. Date: Nov. 22, 2001

(65) Prior Publication Data
US 2003/0138304 A1 Jul. 24, 2003

(30) Foreign Application Priority Data
May 19, 2000 (DE) .......................... 100 24 433

(51) Int. Cl.$^7$ .......................... E21B 10/44; E21B 10/58
(52) U.S. Cl. .................. 175/420.1; 175/323; 175/394; 175/427; 175/430
(58) Field of Search .................. 175/323, 327, 175/401, 419, 420, 425, 426, 427, 430, 431, 394, 420.1

(56) References Cited

U.S. PATENT DOCUMENTS

| | | | | |
|---|---|---|---|---|
| 1,204,805 A | * | 11/1916 | MacDonald ............... | 175/413 |
| 2,032,328 A | * | 2/1936 | Reedy .................... | 175/390 |
| 2,036,817 A | * | 4/1936 | Meinert .................. | 175/419 |
| 2,145,466 A | * | 1/1939 | Urschel .................. | 175/415 |
| 2,604,305 A | * | 7/1952 | Livingstone ............. | 175/398 |
| 2,673,714 A | | 3/1954 | Hargrave | |
| 2,673,716 A | * | 3/1954 | Avery .................... | 175/420.1 |
| 2,776,819 A | * | 1/1957 | Brown .................... | 175/389 |
| 2,855,181 A | * | 10/1958 | Olsen .................... | 175/391 |
| 2,865,606 A | * | 12/1958 | Farmer ................... | 175/420.1 |
| 2,879,036 A | * | 3/1959 | Wheeler .................. | 175/391 |
| 2,894,726 A | * | 7/1959 | Weaver et al. ............ | 175/391 |
| 2,938,709 A | * | 5/1960 | Curtis ................... | 175/390 |
| 3,034,589 A | * | 5/1962 | Hagstrom ................. | 175/420.1 |
| 3,163,244 A | * | 12/1964 | Zimmerman ................ | 175/398 |
| 3,187,825 A | * | 6/1965 | Bower, Jr. ............... | 175/327 |
| 3,339,649 A | * | 9/1967 | Forssen .................. | 175/418 |
| 3,760,894 A | * | 9/1973 | Pitifer .................. | 175/413 |
| 4,314,616 A | * | 2/1982 | Rauckhorst et al. ........ | 175/394 |
| 4,889,200 A | * | 12/1989 | Moser .................... | 175/394 |
| 4,903,787 A | * | 2/1990 | Moser et al. ............. | 175/420.1 |
| 4,951,761 A | * | 8/1990 | Peetz et al. ............. | 175/398 |
| 5,265,688 A | * | 11/1993 | Rumpp et al. ............. | 175/394 |
| 5,467,837 A | | 11/1995 | Miller et al. | |
| 5,482,124 A | * | 1/1996 | Haussmann et al. ......... | 175/415 |
| 5,492,187 A | * | 2/1996 | Neukirchen et al. ........ | 175/394 |
| 6,032,749 A | * | 3/2000 | Bongers-Ambrosius et al. ......... | 175/394 |
| 6,089,337 A | * | 7/2000 | Kleine et al. ............ | 175/394 |
| 6,129,162 A | * | 10/2000 | Hauptmann ................ | 175/394 |
| 6,431,295 B1 | * | 8/2002 | Kleine et al. ............ | 175/415 |
| 2003/0000745 A1 | * | 1/2003 | Huber .................... | 175/427 |

FOREIGN PATENT DOCUMENTS

| | | |
|---|---|---|
| DE | 40 34 86 C | 10/1924 |

(List continued on next page.)

*Primary Examiner*—David Bagnell
*Assistant Examiner*—Jennifer H Gay
(74) *Attorney, Agent, or Firm*—Venable LLP; Robert Kinberg

(57) ABSTRACT

A rock drill including a helical shank and a drill head. The drill head has an end face pointing in a feed direction and at least one roof-shaped carbide cutting element on the end face of the rock drill. The carbide cutting element extends transversely across the drill head and has cutting edges. The end face of the carbide cutting element has an additional chip space at least in front of the carbide cutting element and includes an encircling step to create the additional chip space in the feed direction.

9 Claims, 3 Drawing Sheets

FOREIGN PATENT DOCUMENTS

| | | |
|---|---|---|
| DE | 1 921 677 A1 | 11/1970 |
| DE | 22 11 532 A | 9/1973 |
| DE | 29 12 394 A1 | 10/1980 |
| DE | 81 04 116 U1 | 8/1982 |
| DE | 37 42 661 A1 | 7/1989 |
| DE | 41 02 794 A1 | 8/1992 |
| DE | 43 06 981 A | 9/1994 |
| DE | 195 16 270 C | 1/1997 |
| DE | 297 03 363 U1 | 5/1997 |
| DE | 196 18 298 A1 | 11/1997 |
| DE | 197 09 771 A1 | 9/1998 |
| DE | 298 16 665 U1 | 1/1999 |
| DE | 198 27 535 A1 | 12/1999 |
| DE | 299 22 291 U1 | 3/2000 |
| EP | 0 452 255 B1 | 10/1991 |
| EP | 0 761 927 A1 | 3/1997 |
| EP | 0 836 919 A1 | 4/1998 |
| EP | 1 029 622 A2 | 8/2000 |
| EP | 1 045 112 A | 10/2000 |
| GB | 2 302 664 A | 1/1997 |

* cited by examiner

ROCK DRILL

BACKGROUND OF THE INVENTION

The invention relates to a rock drill having a feed direction, a helical shank and a drill head having an end face pointing in the feed direction.

Rock drills with carbide cutting tips are used for producing holes in concrete, masonry, rock or the like. In this case, the drill head, at its end face, is provided with at least one carbide cutting tip which generally extends over the entire drill head diameter and which, by the rotary-percussive or rotary-hammering drilling drive, has of a type of chiseling effect on the stone material to be disintegrated. The drill hole diameter is determined by the outside diameter of the carbide cutting tip.

In order to reduce the surface pressure on the carbide cutting tip and thus increase the service life of the drill head, cross cutting elements in which "secondary cutting tips" are arranged transversely to a main cutting tip have been disclosed (DE 29 12 394 A1).

Instead of secondary cutting tips which possibly extend over the entire diameter, secondary cutting elements which extend only over part of the radius of the drill head may also be provided (DE 81 04 116 U1).

Furthermore, EP 0 452 255 B1 has disclosed a rock drill in which the secondary cutting elements are designed as cutting pins which are arranged in the radially outer region of the end face of the drill head.

The arrangement of at least one or more additional secondary cutting tips certainly has the advantage that the main cutting tip is to a certain extent relieved of load, since some of the breaking work is assumed by the secondary cutting tip or tips. A disadvantage with this arrangement is the fact that additional fastening space has to be provided here for embedding the secondary cutting tips in the drill head, so that the end face of the drill head has to be designed to be more voluminous overall. This in turn has the disadvantage that the end face of the drill head is enlarged and forms a greater resistance. This also applies in particular to the ease with which the drill can dispose of the drillings to be removed, which collect in the direction of rotation in front of the lips of the main cutting tip and the secondary cutting tips. The quantity of these drillings increases the resistance and thus reduces the drilling advance of the drilling tool. The above problems also apply in principle to drilling tools having only a main cutting tip in which the drill head is of a less slim design and material transport thereby causes problems in the region of the drill head.

A known drilling tool has been disclosed by U.S. Pat. No. 2,673,714. In this drilling tool, an additional chip space is provided by lateral regions of the drill head being cut off in a chord-like manner in front of and behind a cutting tip, these lateral regions exposing the carbide tip in this region. A disadvantage with this is the poor embedding of the carbide tip in this region, since the recesses extend in particular on both sides of the carbide tip.

SUMMARY OF THE INVENTION

An object of the invention is to provide improved drilling advance in a tool as first described above.

This and other objects are achieved by a rock drill such as that first described above and having at least one roof-shaped carbide cutting element on its end face, the carbide cutting element extending transversely across the drill head and having lateral cutting edges. An additional chip space is formed at least in front of one of the cutting edges of the carbide cutting element, and the end face of the drill head has an encircling step directly in front of each cutting edge.

The central idea of the invention is to improve the conveying properties of a rock drill in the region of the carbide cutting element or elements. This also applies in particular to drilling tools having a larger nominal diameter in which radially outer secondary cutting elements and in particular secondary cutting tips are provided which can perform a considerable proportion of the removal work to be applied to the rock, or to tools having a higher penetration resistance on account of a larger area of resistance of the drill head. By an enlargement of the chip space lying in front of a carbide cutting tip, in particular in the radially outer region, the drillings are disposed of more easily. In order to compensate for the disadvantage of the additional cutting elements with the associated impaired disposal of the drillings in the drill head region, the invention likewise provides an additional chip space, at least also in front of the respective secondary cutting tip or a corresponding carbide cutting element. This additional chip space is made by a step in the end face of the drill head, the stepped surface region being located, as far as possible, directly in front of a corresponding cutting tip. The enlargement of the chip space thereby provided for the disposal of drillings has a wear-reducing effect on the drill head, since the drillings form a smaller resistance and can be disposed of more easily.

In particular, secondary cutting tips of various designs are advantageously used, these secondary cutting tips being designed at the end face so as to be either level, that is to say at approximately a right angle to the drill longitudinal axis, or inclined. In the latter case, the lip of the secondary cutting tip, this lip lying on a lateral surface of a cone, may lie on the same lateral surface of a cone as a main cutting tip inclined in a roof shape or may be set back from this lateral surface of a cone.

The step-shaped, a real shoulder in front of the respective secondary cutting tip is preferably designed in such a way that a top, roughly lateral surface of a cone forms in the direction of the drill point in the radially inner region, and a type of frustoconical surface forms in the region in front of the secondary cutting tip.

The height of the step is selected such that it corresponds approximately to the cutting surface of the main cutting tip or of the secondary cutting element. As a result, sufficient additional chip space is provided for the disposal of the drillings in front of the corresponding cutting tip.

BRIEF DESCRIPTION OF THE DRAWINGS

Further details and advantages of the invention follow from the exemplary embodiments which are described below and are explained in more detail with reference to drawings.

In the drawings:

FIG. 2b shows a side view of the representation according to FIG. 2a;

DETAILED DESCRIPTION OF PREFERRED EMBODIMENTS

Figure 1A:
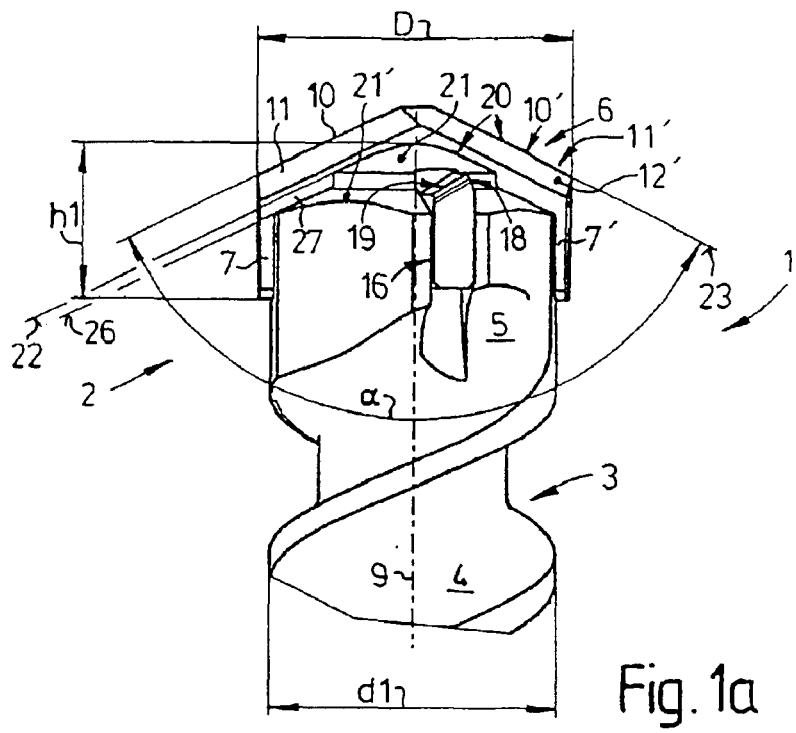
FIG. 1a shows a side view of a drilling tool according to the invention in the region of the drill head with conveying-helix runout.
Figure 1B:
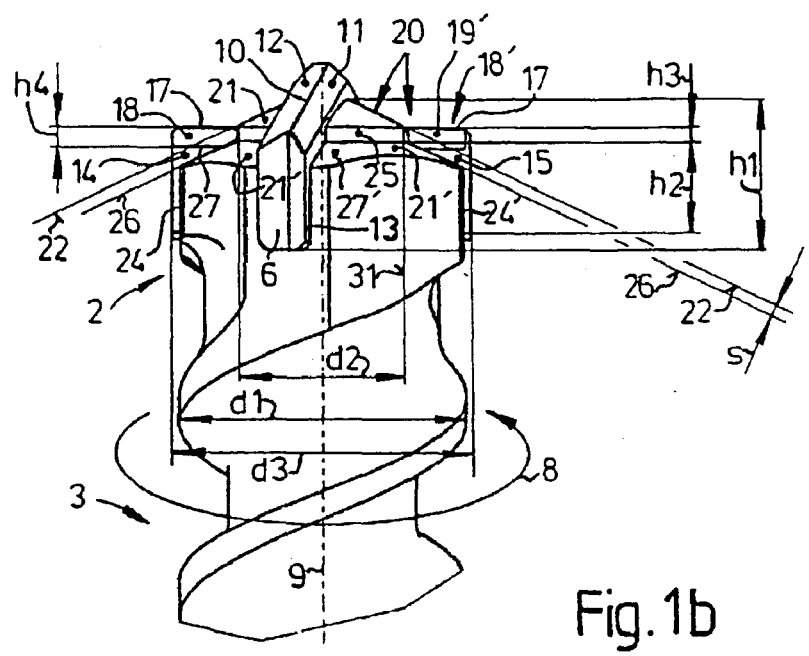
FIG. 1b shows a side view of the drilling tool according to FIG. 1a, FIG. 2a shows a further exemplary embodiment for a drilling tool according to the invention having a modified secondary cutting tip.

According to the first exemplary embodiment of the invention according to FIG. 1a and FIG. 1b, the rock drill 1 consists of a drill head 2 and an adjoining single- or multi-start conveying helix 3. The conveying helix 3, with its conveying-helix flute 4, runs out into the drill head 2. The runout of the conveying-helix flute 4 into the drill head is designated by reference numeral 5.

The drill head 2 comprises a carbide cutting tip 6 which, in side view according to FIG. 1a, is designed as a roof-shaped main cutting tip and encloses an angle of $\alpha \approx 130°$. The main cutting tip passes through the entire diameter $d_1$ of the drill head and protrudes beyond the latter with lateral projections 7, 7' for forming the drill nominal diameter D. The main cutting tip 6 has front-end cutting edges 10, 10' which are arranged on both sides of a drill longitudinal axis 9 and which have, in the direction of rotation (arrow 8), a rake face 11, 11' lying in front of them and a flank 12, 12' lying behind them. The main cutting tip 6 is embedded in the drill head by means of an axial longitudinal slot 13 having a height $h_1$ and is firmly anchored by means of a brazed joint.

In addition to the main cutting tip 6, the drilling tool according to the invention, according to FIGS. 1a, 1b, also has two secondary cutting tips 14, 15, which are likewise each embedded in the drill head 2 in an axial longitudinal slot 16 by means of a brazed joint. As can be seen from the exemplary embodiment according to FIGS. 1a, 1b, the secondary cutting tips 14, 15 likewise have a top level cutting edge 17, which is oriented approximately perpendicularly to the drill longitudinal axis 9. In the direction of rotation (arrow 8), each secondary cutting tip again has a front rake face 18, 18' and a rear flank 19, 19'.

The arrangement of main cutting tip 6 and secondary cutting tips 14, 15 results in a drill head having cross cutting elements, it being possible for the cross produced to assume an angle of 90° or even an obtuse angle.

The end face 20 of the drill head consists at least partly of a top lateral surface 21 of a cone, which is arranged on a conical surface 22 of rotation. This cone 22 of rotation lies approximately parallel to the conical surface 23 of rotation through the cutting edge 10, 10' of the main lip 6.

The radial extent of the opposite secondary cutting tips 14, 15 results from the inside diameter $d_2$ and the outside diameter $d_3$. The outside diameter $d_3$ is greater than the diameter $d_1$ of the drill head 2 by a lateral projection 24, 24'.

According to a preferred exemplary embodiment, the end face 20 of the drill head is now provided with at least one axially extending, cylindrical shoulder 25, which approximately has a height $h_3$, the height $h_3$ preferably being equal to or slightly less than the lateral projection height $h_4$ of the rake face 18, 18' of the secondary cutting tip 14, 15. The embedding depth of the secondary cutting tip 14, 15 in the drill head is designated by $h_2$.

This approximately axially oriented shoulder 25 produces an axially offset frustoconical surface 21' which lies on the conical surface 26 of rotation, which is arranged in a shoulder "s" relative to the conical surface 22 of rotation. This results in an enlarged chip space 27 in front of the rake face 18, 18' for drillings to be removed, which has a positive effect on the drilling advance. The end face 20 of the drill head 2, by means of the shoulder 25, is consequently designed in a step shape, having a top cone point 21, an axial shoulder 25 and a following frustum 21' of a cone, the conical surfaces 22, 26 of rotation running parallel to one another at a distance "s". Such an arrangement forms an additional chip space 27, 27', which results approximately from the thickness "s" and the diameter difference d3–d2. The radially inner edges 31 of the secondary cutting elements 14, 15 are consequently arranged at a distance ½ * d2 from the drill center axis 9. The shoulder 25 extends radially starting from the inner edge 31 of the secondary cutting elements 14, 15.

Figure 2A:
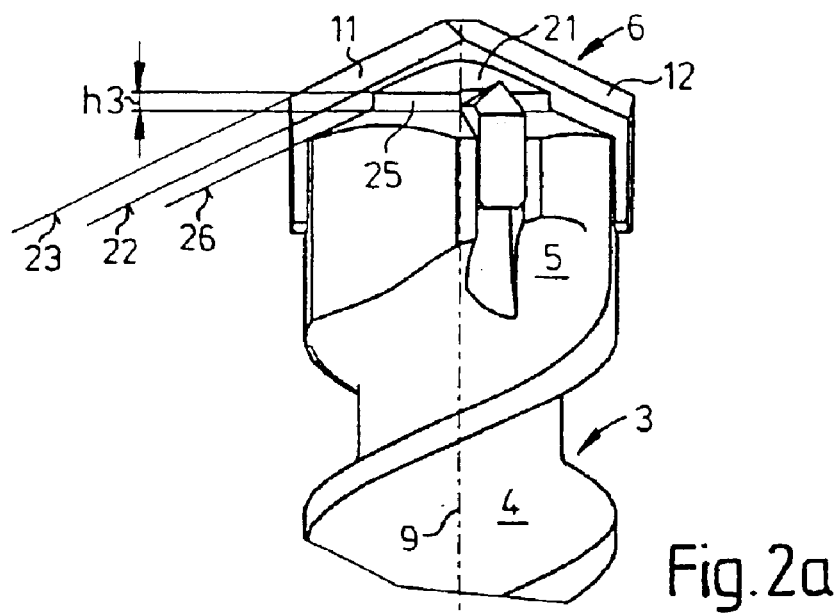
Figure 2B:
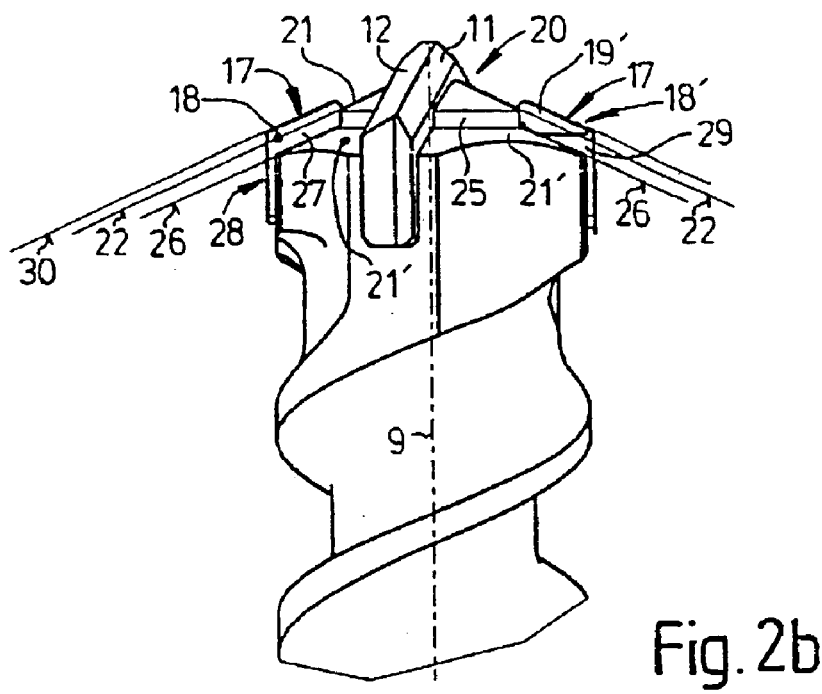

A modified embodiment of the secondary cutting tips 28, 29 is selected in the exemplary embodiment according to FIGS. 2a, 2b. In this case, the front-end cutting edges 17 are likewise located on a lateral surface 30 of a cone, which is set back slightly from the conical surface 23 of rotation of the main cutting tip 6.

The top part 21 of the end face 20 of the drill head 2 again lies on the conical surface 22 of rotation, which is set back slightly from the conical surface 30 of rotation of the front-end cutting edges 17 of the secondary cutting tips 28, 29.

In a similar manner to the design of the exemplary embodiment according to FIGS. 1a, 1b, an axial shoulder 25 is also provided in the exemplary embodiment according to FIGS. 2a, 2b, this shoulder 25 being directed toward an offset, frustoconical surface section 21' on the conical surface 26 of rotation. As a result, an additional chip space 27 is again formed in front of the respective rake face 18, 18' of the secondary cutting tips 28, 29, this chip space 27 serving for improved disposal of the drillings in front of these secondary cutting tip 28, 29.

The step-shaped design of the end face 20 of the drill head 2 thus results in an increase in the chip volume, that is to say an additional chip space is formed in particular in front of the secondary cutting tips. In this case, the additional chip space extends radially outward in a frustoconical manner starting from the shoulder 25. Here, the height $h_3$ of the shoulder 25 determines the additional chip space 27.

Figure 3:
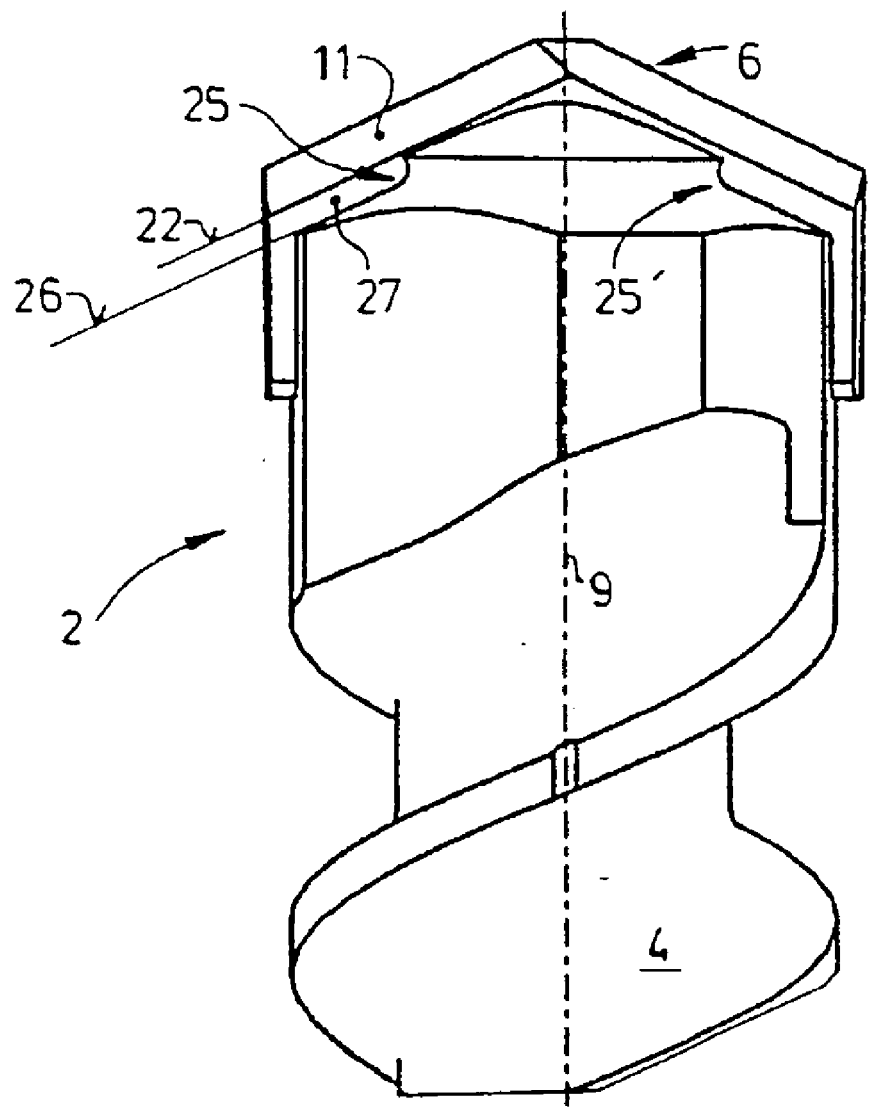
FIG. 3 shows an exemplary embodiment of the invention with only one carbide cutting tip.

FIG. 3 shows the subject matter of the present invention with only one carbide cutting tip 6, as also shown in FIGS. 1 and 2. Apart from that, the same parts are provided with the same reference numerals as in FIGS. 1 and 2. The secondary cutting tips contained in FIGS. 1 and 2 are omitted in FIG. 3, so that the additional chip space 27 serves for the disposal of the drillings which are removed by the carbide cutting tip 6. For this purpose, the drill head 2 again has a shoulder 25 or step 25, by means of which the axially offset lateral surfaces 22, 26 of the cones are formed. This corresponds to the design of the drill head in FIG. 1 or 2.

As can be seen from FIG. 3, the shoulder 25 or the step 25 may be formed by an axially parallel recess edge 25', in which case the bottom transition to the lateral surface 26 of the cone may be rounded off, or may be of cornered design as in the exemplary embodiments according to FIGS. 1 and 2. The decisive factor is the additional chip space, resulting from the step, in front of the rake face 11 of the carbide cutting tip 6.

The invention is not restricted to the exemplary embodiment shown and described. On the contrary, it also comprises all modifications and developments within the scope of the patent claims. In particular, the chip space enlargement formed by the shoulder 25 may also have another geometry in accordance with the head geometry of the drill head.

List of Designations:
1 Rock drill
2 Drill head
3 Conveying helix
4 Conveying-helix flute
5 Runout of 4 into 2
6 Carbide cutting tip
7 Projection
8 Direction of rotation
9 Drill longitudinal axis
10 Cutting edge
11 Rake face
12 Flank
13 Longitudinal slot
14 Secondary cutting tip
15 Secondary cutting tip
16 Longitudinal slot
17 Cutting edge
18 Rake face
19 Flank
20 End face
21 Lateral surface of a cone
22 Cone of rotation
23 Conical surface of rotation
24 Projection
25 Shoulder/step
26 Lateral surface of a cone
27 Chip space
28 Secondary cutting tip
29 Secondary cutting tip
30 Conical surface of rotation
31 Inner edge of the secondary cutting tip

What is claimed is:

1. A rock drill having a feed direction, the rock drill comprising:
   a helical shank; and
   a drill head having an end face pointing in the feed direction and at least one roof-shaped carbide cutting element on the end face of the drill head,
   the carbide cutting element extending transversely across the drill head and having cutting edges, and
   the carbide cutting element having a rake face, with a chip space being located at least in front of the rake face,
   wherein the end face of the drill head includes an encircling step to create an additional chip space in the feed direction.

2. The drill as claimed in claim 1, wherein the drill head has a diameter and the carbide cutting element includes a carbide cutting tip, the carbide cutting tip extending at least over the diameter of the drill head, and at least one secondary cutting element arranged transversely to the carbide cutting tip at a distance from a longitudinal center axis of the drill and wherein the additional chip space is formed in front of at least one of the carbide cutting tip or the at least one secondary cutting element.

3. The drill as claimed in claim 2, wherein the secondary cutting element is radially extending and the end face includes a conical portion having a lateral surface, the lateral surface having an axially extending stepped chip space that constitutes the additional chip space, at least in the area of the radially extending secondary cutting element.

4. The drill as claimed in claim 1, wherein the at least one roof-shaped carbide cutting element defines an angle, and wherein the stepped end face of the drill head has a plurality of lateral conical surfaces, the respective lateral conical surfaces each having a conical angle that is approximately equal to the angle of the carbide cutting element.

5. The drilling tool as claimed in claim 2, wherein the drill head has a radius and wherein the secondary cutting element extends approximately over half the radius of the drill head in a region directed radially outward.

6. The drill as claimed in claim 2, wherein the secondary cutting element has a front-end cutting edge arranged approximately at a right angle to the longitudinal center axis.

7. The drill as claimed in claim 2, wherein the cutting edges of the carbide cutting tip define a first imaginary cone and the secondary cutting element has a cutting edge defining a second imaginary cone, and wherein lateral surfaces of the second imaginary cone lie on lateral surfaces of the first imaginary cone or on lateral surfaces of a third imaginary cone set back axially from the first imaginary cone, and an angle enclosed by the lateral surfaces of the second imaginary cone is the same as the angle enclosed by the lateral surfaces of the first imaginary cone.

8. The drill as claimed in claim 2, wherein the encircling step defines an axially extending, cylindrical shoulder and wherein the secondary cutting element has a cutting edge arranged perpendicular to the longitudinal center axis at an axial height which corresponds to a top edge of the shoulder.

9. The drill as claimed in claim 8, wherein the secondary cutting element has a rake face and the height of the shoulder is approximately the same size as a projection height of the rake face of the secondary cutting element.

* * * * *